US011550798B2

(12) United States Patent
Lewis et al.

(10) Patent No.: US 11,550,798 B2
(45) Date of Patent: *Jan. 10, 2023

(54) RANKING ALGORITHMS USING UNIQUE BUCKETING IDENTIFIERS

(71) Applicant: Google LLC, Mountain View, CA (US)

(72) Inventors: Justin Lewis, Marina del Rey, CA (US); Ruxandra Georgiana Paun, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/927,980

(22) Filed: Jul. 13, 2020

(65) Prior Publication Data

US 2020/0341992 A1    Oct. 29, 2020

Related U.S. Application Data

(63) Continuation of application No. 15/708,025, filed on Sep. 18, 2017, now Pat. No. 10,713,263, which is a continuation of application No. 14/079,862, filed on Nov. 14, 2013, now Pat. No. 9,767,158.

(60) Provisional application No. 61/888,805, filed on Oct. 9, 2013.

(51) Int. Cl.
    *G06F 16/2457* (2019.01)
(52) U.S. Cl.
    CPC .............................. *G06F 16/24578* (2019.01)

(58) Field of Classification Search
    None
    See application file for complete search history.

(56) References Cited

U.S. PATENT DOCUMENTS

| 8,484,224 | B1 | 7/2013 | Harris et al. |
| 8,972,402 | B1 | 3/2015 | Gupte et al. |
| 10,268,641 | B1 * | 4/2019 | Guha ................. G06F 16/24578 |
| 10,304,066 | B2 * | 5/2019 | Tseng ...................... H04L 51/52 |
| 10,372,715 | B1 * | 8/2019 | James ................. G06F 16/9535 |

(Continued)

*Primary Examiner* — Uyen T Le
(74) *Attorney, Agent, or Firm* — Lowenstein Sandler LLP (57) ABSTRACT

A processing device identifies a set of content items to be included in a feed displayed to a user of a social network platform in a user interface of the social network platform, wherein the set of content items are identified as candidates for inclusion in the feed based on a ranking score of each content item from the set of content items, and wherein the ranking score of each content item is generated in addition to identifying one or more bucketing tokens for a respective content item from the set of content items. For each content item from the set of content items, the processing device identifies one or more bucketing tokens, wherein each bucketing token comprises an identifier that identifies a plurality of content items as being associated with a group of users that have similar interests. Further, the processing device adjust a ranking score of each content item from the set of content items that has at least one bucketing token matching a bucketing token associated with the user of the social network platform, wherein the set of content items to be included in the feed displayed to the user in the user interface of the social network platform is to be modified based on adjusted ranking scores of respective content items from the set of content items.

20 Claims, 7 Drawing Sheets

(56) References Cited

U.S. PATENT DOCUMENTS

| | | | |
|---|---|---|---|
| 2006/0041553 A1 | 2/2006 | Paczkowski et al. | |
| 2010/0070448 A1 | 3/2010 | Omoigui | |
| 2012/0110064 A1 | 5/2012 | Chen et al. | |
| 2013/0151613 A1* | 6/2013 | Dhawan | H04L 63/10 709/204 |
| 2014/0164365 A1 | 6/2014 | Graham | |
| 2014/0222806 A1* | 8/2014 | Carbonell | G06F 16/90335 707/732 |
| 2014/0330794 A1* | 11/2014 | Dellenbach | G06F 16/9537 707/748 |
| 2014/0351061 A1* | 11/2014 | Luu | G06Q 30/0251 705/14.66 |
| 2019/0236092 A1 | 8/2019 | Garcia | |

* cited by examiner

RANKING ALGORITHMS USING UNIQUE BUCKETING IDENTIFIERS

RELATED APPLICATIONS

This application is a continuation of co-pending U.S. patent application Ser. No. 15/708,025, filed Sep. 18, 2017, which is a continuation of U.S. patent application Ser. No. 14/079,862, filed Nov. 14, 2013, now U.S. Pat. No. 9,767,158, and is related to and claims priority of U.S. Provisional Patent Application No. 61/888,805 filed Oct. 9, 2013, the contents of which are hereby incorporated by reference herein.

TECHNICAL FIELD

This disclosure relates to the field of media viewing services and, in particular, to improved ranking algorithms using unique bucketing identifiers.

BACKGROUND

On the Internet, content sharing platforms or other applications allow users to upload, view, and share digital content such as media items. Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume the media items (e.g., watch digital videos, listen to digital music).

One function of ranking services is to take content items made available by the content sharing platforms and arrange a playlist or feed of content items. The playlist or feed may contain a number of content items arranged in a ranking based on an expected popularity of the content items. The ranking services may make these playlists or feeds available to their users for consumption. Given the limited amount of information about the users and their consumption history known to the ranking services, the ranking of content items by the ranking services is often less than optimal.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a user bucketing module on a server in a content sharing platform identifies, in the content sharing platform, a bucket comprising a plurality of associated content items and associates a bucketing token with each of the plurality of associated content items. To identify the bucket, the user bucketing module identifies a first user of the content sharing platform, identifies a first set of content items previously viewed by the user on the content sharing platform, and identifies a second set of content items previously viewed by a second user of the content sharing platform, where the second user also viewed the first set of content items. The user bucketing module determines if a bucket that contains both the first and second sets of content items exists in the content sharing platform, and if a bucket that contains both the first and second sets of content items does not exist, creates a new bucket.

The bucketing token comprises a unique identifier that identifies the plurality of associated content items as being associated with the identified bucket, and the plurality of associated content items are of interest to a common group of users of the content sharing platform. To associate the bucketing token with each of the plurality of associated content items, the user bucketing module either embeds the bucketing token in a metadata of each of the plurality of associated content items or maintains a data structure comprising mappings between the bucketing token and the plurality of associated content items The user bucketing module receives a request for the bucketing token from a ranking service and provides the bucketing token to the ranking service, the ranking service to apply the bucketing token to a ranking algorithm to determine a ranking score for a content item of the plurality of associated content items. In one implementation, to receive the request for the bucketing token from the ranking service, the user bucketing module receives a request for a content item of the plurality of associated content items, wherein the bucketing token is associated with the content item, and to provide the bucketing token to the ranking service, the user bucketing module provides the requested content item to the ranking service, wherein the bucketing token is embedded in a metadata of the content item.

BRIEF DESCRIPTION OF THE DRAWINGS

The present disclosure is illustrated by way of example, and not by way of limitation, in the figures of the accompanying drawings.

DETAILED DESCRIPTION

Implementations are described for improved ranking algorithms using unique bucketing identifiers. Content sharing platforms generally have very good user bucketing for delivering personalized video recommendations. Similarly many other sites and services across the web have great user bucketing for the users consuming content from their own site. Ranking services, such as social networks, use a variety of tools to handle feed ranking, but generally they do not have access to the per-site bucketing and categorization information.

Not all social network users have the same interests, and, although social networks tend to have identified the interests of their users, in most cases social networks have a difficult time determining what kind of content a given post includes.

When a new piece of content (e.g., a digital video hosted by a separate content sharing platform) is posted to a social network, the social network has very little information about that video to figure out how to rank it. At best, the social network might be able to pull some keywords from the video title or description. In order for the video to perform well on the social network, it helps to have a high click-through-rate. If the social network is guided as to which users it shows the video to, then the click-through-rate for that video may be higher. This has some residual effects as it may cause the video to be more highly ranked in other user's feeds due to the increased user interaction with the video.

Eventually the social network may be able to learn what kinds of users interact with a video, however, this can take several unpersonalized impressions. As a result, videos which do not have meaningful titles or descriptions or are not accompanied by meaningful custom text from the user, tend to behave more poorly than videos which have these elements. By using user bucketing tokens provided by the content ranking service, this barrier to entry can be eliminated so that new videos are not poorly judged based on their metadata content. Instead the ranking can be based on the more experienced bucketing provided by the content sharing platform.

In one example, a first user likes a video titled "Milan fashion week highlights." If the user posts the video on a social network or other feed ranking service, all her fashion-forward friends may view and like it. There may be a second user, who is connected with the first user on the social network, but is not much into fashion. The second user's interests may lie more in the video game area. If the first user and the second user have a lot of common connections on the social network, the "Milan fashion week highlights" video may get ranked highly in the second user's feed. A second video about video games, which would be of interest to the second user, may not get as much attention among the shared connections on the social network and therefore gets ranked lower in the second user's feed. The second user may not see the second video and therefore doesn't watch it, but neither does he watch the fashion video. Thus, a user session and an opportunity to reshare a video that could lead to more user sessions are lost. This can be avoided if the social network has a way to know the interest buckets associated with the two videos and rank the posts appropriately for the individual users.

The techniques described herein are useful to both the content hosts and the feed ranking service. For the content hosts, the use of user bucketing tokens can generate more watchtime and referrers, and for the feed ranking services, the bucketing tokens can deliver more time on site and an improved user experience.

Figure 1:
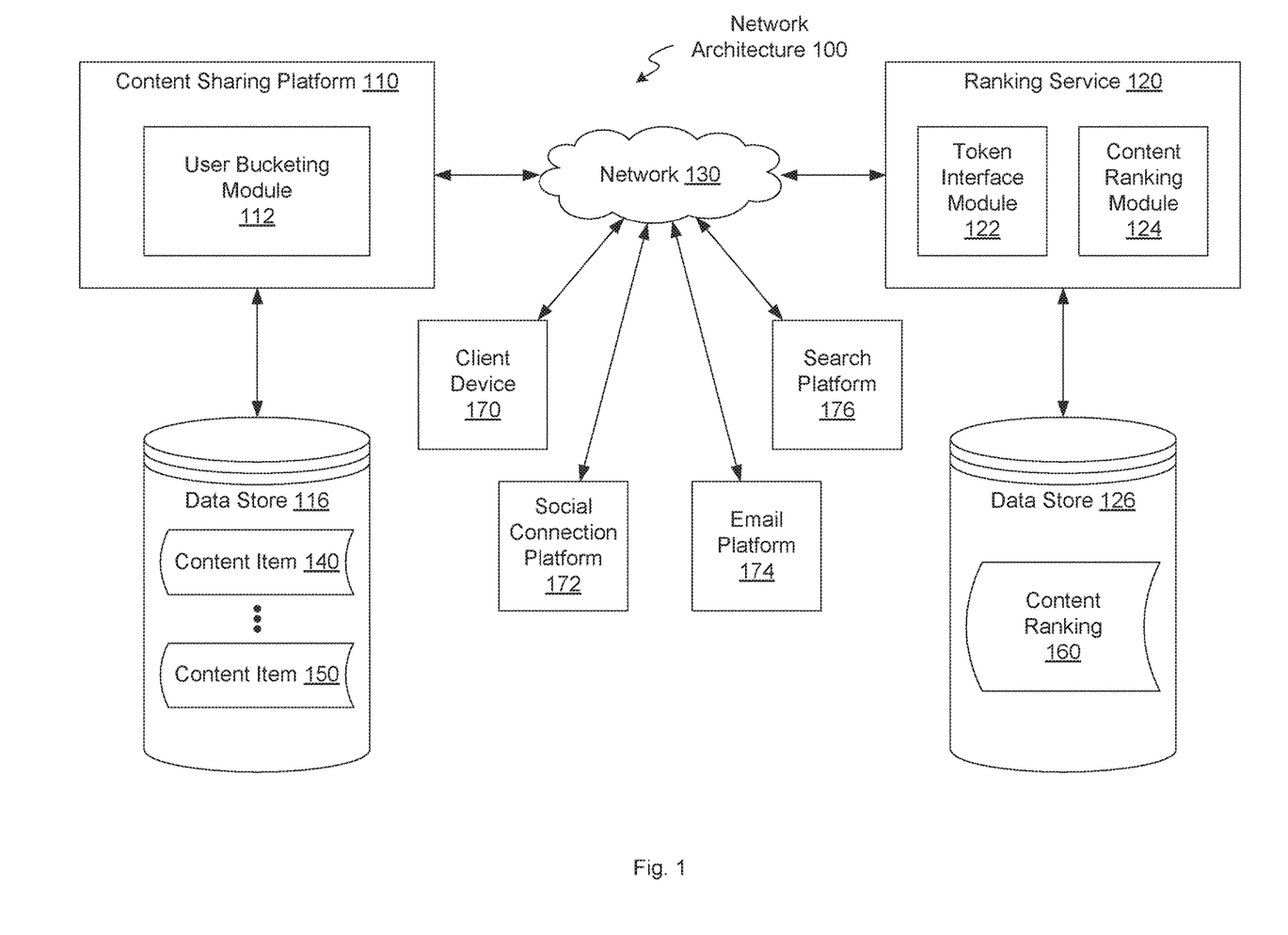
FIG. 1 is a block diagram illustrating an exemplary network architecture in which implementations of the present disclosure may be implemented.

FIG. 1 is a block diagram illustrating an exemplary network architecture 100 in which implementations of the present disclosure may be implemented. In one implementation, the network architecture 100 includes client device 170, a network 130, data store 116, 126, a content sharing platform 110, a ranking service 120, a social connection platform 172, an email platform 174, and a search platform 176. In one implementation, network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data stores 116, 126 may be may be a memory (e.g., random access memory), a cache, a drive (e.g., a hard drive), a flash drive, a database system, or another type of component or device capable of storing data. The data stores 116, 126 may also include multiple storage components (e.g., multiple drives or multiple databases) that may also span multiple computing devices (e.g., multiple server computers).

Client device 170 may include a computing device such as a personal computer (PC), laptop, mobile phone, smart phone, tablet computer, netbook computer, etc. Client device 170 may include a media viewer. In one implementation, the media viewer may be an application that allows users to view content, such as images, videos, web pages, documents, etc. For example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant). In another example, the media viewer may be a standalone application that allows users to view digital media items (e.g., digital videos, digital images, electronic books). For example, the media viewer may be an embedded media player that is embedded in a web page provided by the content sharing platform 110. In another example, the media viewer may be an application that is downloaded from a server.

In one implementation, content sharing platform 110 may include one or more computing devices (such as a rack mount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 110 may allow a user to consume, upload, search for, approve of ("like"), dislike, and/or comment on media items. The content sharing platform 110 may also include a website (e.g., a webpage) or mobile application that may be used to provide a user with access to the media items. The content sharing platform 110 may provide one or more content items 140, 150 to the user. Examples of content items can include, and are not limited to, digital videos, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, and the like. Content items 140, 150 may be consumed via the Internet and/or via a mobile device application. For brevity and simplicity, an online video (also hereinafter referred to as a video) is used as an example of a content item throughout this document. As used herein, "media," "media items," "online media items," "digital media," "content items" and "digital media items" can include an electronic file that can be executed or loaded using software, firmware or hardware configured to present the digital media item to an entity. In one implementation, the content sharing platform 110 may store the content items using the data store 116.

In one implementation, content sharing platform includes a user bucketing module 112. User bucketing module 112 may determine user bucketing tokens representative of a group of content items that are of interest to a similar group of users. User bucketing module 112 can provide the user bucketing tokens to a third party, such as ranking service 120, to allow for improved ranking of the content items 140, 150. In one implementation, user bucketing module 112 identifies a set of buckets for a given video (or URL). In one implementation, these may be the same buckets that are used by the content sharing platform for delivering personalized recommended videos to users and the categorical topics used to build channels. In the invisible metadata on a video watch page, unique identifiers (i.e., tokens) for these buckets may be listed. These unique identifiers might be human readable (e.g., 'mmorpg gaming livestream', 'southeast conservative asian fashion', etc.) or they might not be (e.g., '2312854', 'XI_8Edi72i', etc.). In one implementation, the metadata will look like: <meta itemprop="consumptionBuckets" content="UCm1zxx2H, vlBJ4GU7ff, Jsr3qD0Q">. Additional details of content sharing platform 110 are provided below with respect to FIGS. 2-5B.

Ranking service 120 may include one or more computing devices (e.g., servers), data stores, networks, software components, and/or hardware components that may be used to allow users to connect to, share information, and/or interact with each other. Ranking service 120 may present to a user a listing (e.g., activity feed, feed, stream, wall, etc.) of objects (such as posts, content items (e.g., video, images, audio, etc.), status updates, favorability indications, tags, messages, and so on) generated by other users of a social network. Ranking service 120 may also include a content sharing aspect that allows users to upload, view, tag, and share content, such as text content, video content, image content, audio content, and so on. Other users of ranking service 120 may comment on the shared content, discover new content, locate updates, share content, and otherwise interact with the provided content. In one implementation, content sharing platform 110 may be integrated with ranking service 120. For example, ranking service 120 may use content sharing platform 110 to allow users to upload and/or share content. In another implementation, ranking service 120 may be separate from content sharing platform 110. In one implementation, ranking service 120 may also include chat functionality (e.g., a chat platform) to allow users to chat (e.g., to instant message) each other.

In one implementation, ranking service 120 includes token interface module 122 and content ranking module 124. Once a content item is posted to ranking service 120, token interface module 122 may crawl the associated URL and retrieve all of the metadata from the page. For example, the metadata may list the title, description, thumbnail, etc. of the video. This data may be cached by the social network in the same row of a database as the feed item that is generated from the post (in an alternative this might be stored in a different table, or refetched at any time including serve time).

To generate a ranked feed, ranking service 120 may identify a selection of candidate posts (e.g., generated from the list of users that the reader is subscribed to, but they might also include other sources such as paid advertisements or items that are personalized for the user but not from a subscribed source). Ranking service 120 may generate scores for each of the posts that determine the posts' placement in the ranked feed. This score may be a combination of factors including the content of the post as well as the time of post creation and the amount of interaction of the post with the user's friends.

In one implementation, the user buckets discovered and used by the content sharing platform 110 are passed anonymously to ranking service 120 so that they can be used as part of the scoring and candidate recommendation algorithms. Token interface module 122 can either retrieve the user bucketing token from the page metadata or make a separate request (e.g., a remote procedure call (RPC) or application programming interface (API) call) form the token or tokens associated with a given URL. In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by content sharing platform 110 and ranking service 120.

Token interface module 122 can identify which buckets a user belongs to based off of the buckets supplied by the video the user watches and likes (or comments on) on the social network. Token interface module 122 might use other factors to identify which bucket the users belong to. For example, the buckets might have a common naming standard that the social network can already canonicalize. Or the social network might recognize that one cluster of its users heavily consumes videos labeled with bucket XIOAKIDOW, and so it will then identify all users of that cluster as also belonging to the bucket XIOAKIDOW. Token interface module 122 can provide the tokens as inputs to content ranking module 124 which will adjust the ranking of a given content item 140 based on the tokens, and potentially other factors.

In one implementation, ranking service 120 is described as being implemented by a social network. In other implementations, however, ranking service 120 could be implemented by any kind of feed ranking service. For example RSS feeds Search results, Email clients, news aggregators, movie aggregating services (e.g., Netflix), etc. In another implementation, the buckets described in the metadata on a page may come from a third party. For example a news site might request buckets from a social network, and then put those bucket tokens in the metadata on the page served from the URL. Then when the news site is ranked in search results on a search engine, the social network buckets are used for user targeting/personalization.

In one implementation, email platform 174 may be one or more computing devices (e.g., servers), data stores, networks, software components, and/or hardware components that may be used to allow users to send and/or receive electronic-mail (emails) to each other. For example, a first user may use the email platform 174 to send an email to a second user regarding the time and location of a particular event. The first user may also attached files (e.g., video files, image files, text files, etc.) to the email. In one implementation, the email platform 174 may also include chat functionality (e.g., a chat platform) to allow users to chat (e.g., to instant message) each other. In another implementation, the search platform 176 may be one or more computing devices, data stores, networks, software components, and/or hardware components that may be used to allow users to search for information and/or data. For example, the search platform 176 may allow a user to search the Internet and/or other networks for articles, blogs, websites, webpages, images, videos, and/or other content related to a particular topic (e.g., how to fix a car). The search platform 176 may also include a search engine.

Figure 2:
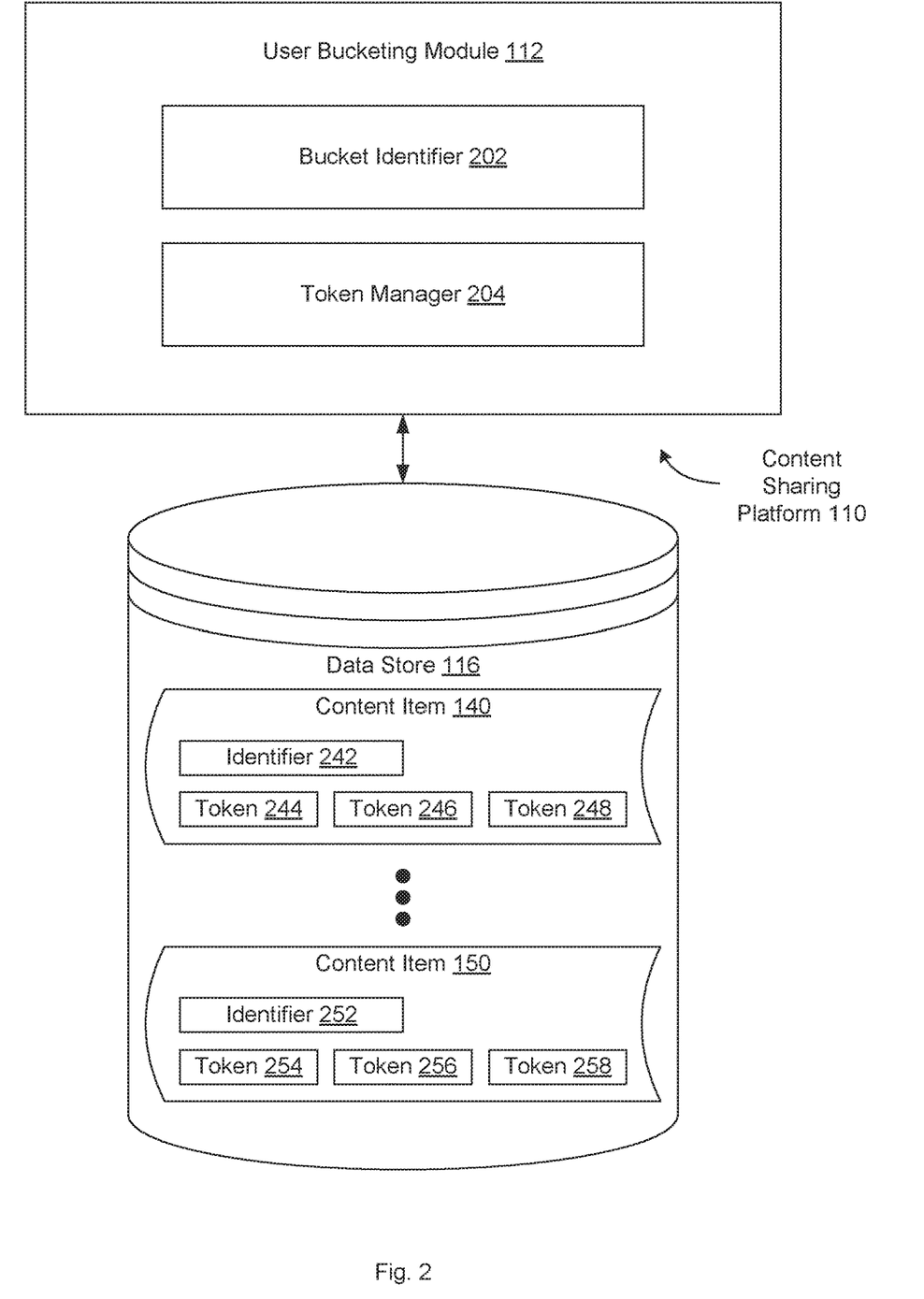
FIG. 2 is a block diagram illustrating a user bucketing module, according to an implementation.

FIG. 2 is a block diagram illustrating user bucketing module 112, according to an implementation. In one implementation, user bucketing module 112 includes bucket identifier 202 and token manager 204. This arrangement of modules and components may be a logical separation, and in other implementations, these modules or other components can be combined together or separated in further components, according to a particular implementation. In one implementation, data store 116 is connected to content sharing platform 110 and includes content items 140, 150. In one implementation, content sharing platform 110 may include both user bucketing module 112 and data store 116. In another implementation, data store 116 may be external to content sharing platform 110 and may be connected to content sharing platform 110 over a network or other connection. In other implementations, content sharing platform 110 may include different and/or additional components which are not shown to simplify the description. Data store 116 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, bucket identifier 202 determines which content items should be placed in a given bucket and determines which buckets should be associated with a given user. A bucket may include one or more content items that are of interest to the same group of users. Multiple users may be associated with a given bucket because they have a shared interest in the content items in that bucket. Bucket identifier 202 may group content items into buckets in a variety of ways including, for example, using categorization or using related videos.

With respect to categorization, bucket identifier 202 may extract information about a content item from metadata associated with the content item or from within the content item itself. Bucket identifier 202 may extract keywords or phrases from the title, description, or summary of the content item or may perform text or image recognition to identify subjects in the actual content. The results of this extraction may be used as categories for the content item. For example, if the content item is a video of the Eifel Tower, the determined categories may be "France," "Paris," "Eifel Tower," and "architecture." In other implementations, bucket identifier 202 can receive categories input by the content creator or curator. Bucket identifier 202 can use the determined categories as separate buckets into which the content items can be placed. If a user has a demonstrated interest in a content item in a given bucket (e.g., based on the users' watch history, "likes," postings, comments, subscriptions, or other factors), bucket identifier 202 may associate the corresponding bucket with the user.

In another implementation, rather than through categories, bucket identifier 202 can place content items in buckets based on related content items. For example, bucket identifier 202 can identify a set of content items previously viewed by a given user in content sharing platform 110. Bucket identifier 202 can then identify a second set of content items previously viewed by other users of the content sharing platform, who also viewed the first set of content items. Bucket identifier 202 can determine if a bucket that contains the intersection of both the first and second sets of content items exists in the content sharing platform, or if there are other buckets associated with the other users. Bucket identifier can then associate those buckets with the first user.

In one implementation, user bucketing module 112 keeps track of buckets and the associated users using bucketing tokens. Token manager 204 may generate a bucketing token representing each bucket and associate the token with the content items in the bucket. In one implementation, token manager 204 may embed the bucketing token in the metadata of a content item. For example, data store 116 may include a number of content items 140, 150, which are each identified by some unique identifier 242, 252 (e.g., a URL, UUID). The unique identifiers 242, 252 may be used by content sharing platform 110 and ranking service 120 to request or identify the content items 140, 150 respectively. Token manager 204 may associate one or more tokens 244, 246, 248, 254, 256, 258 with each of the content items 140, 150 based on the findings of bucket identifier 202. In one implementation, a bucketing token is another unique identifier that identifies each content item as being associated with the identified bucket. In one implementation, the bucketing tokens are not human readable and are not indicative of anything about the bucket they represent other than to signify that the content items contained in the associated bucket are related in some way. The associated content items in a given bucket are likely of interest to a common group of users of the content sharing platform 110. In another implementation, token manager 204 may maintain a database or other data structure in data store 116 with mappings between the tokens and the content items.

Token manager 204 may also provide the tokens associated with a given content item to a requestor (e.g., ranking service 120). For example, token manager 204 may receive a request for either a content item directly or for the tokens associated with a given content item. In one implementation, the request may identify the content item 140, 150 by the corresponding identifier 2242, 252. Depending on the nature of the request, token manager 204 may either identify the corresponding content item 140, 150 with bucketing tokens embedded therein, or may identify the corresponding tokens, using, for example the token mapping database. Token manager 204 may provide a response to ranking service 120, which may apply the bucketing token to a ranking algorithm to determine a ranking score for a content item, as described below with respect to FIGS. 5A and 5B.

Figure 3:
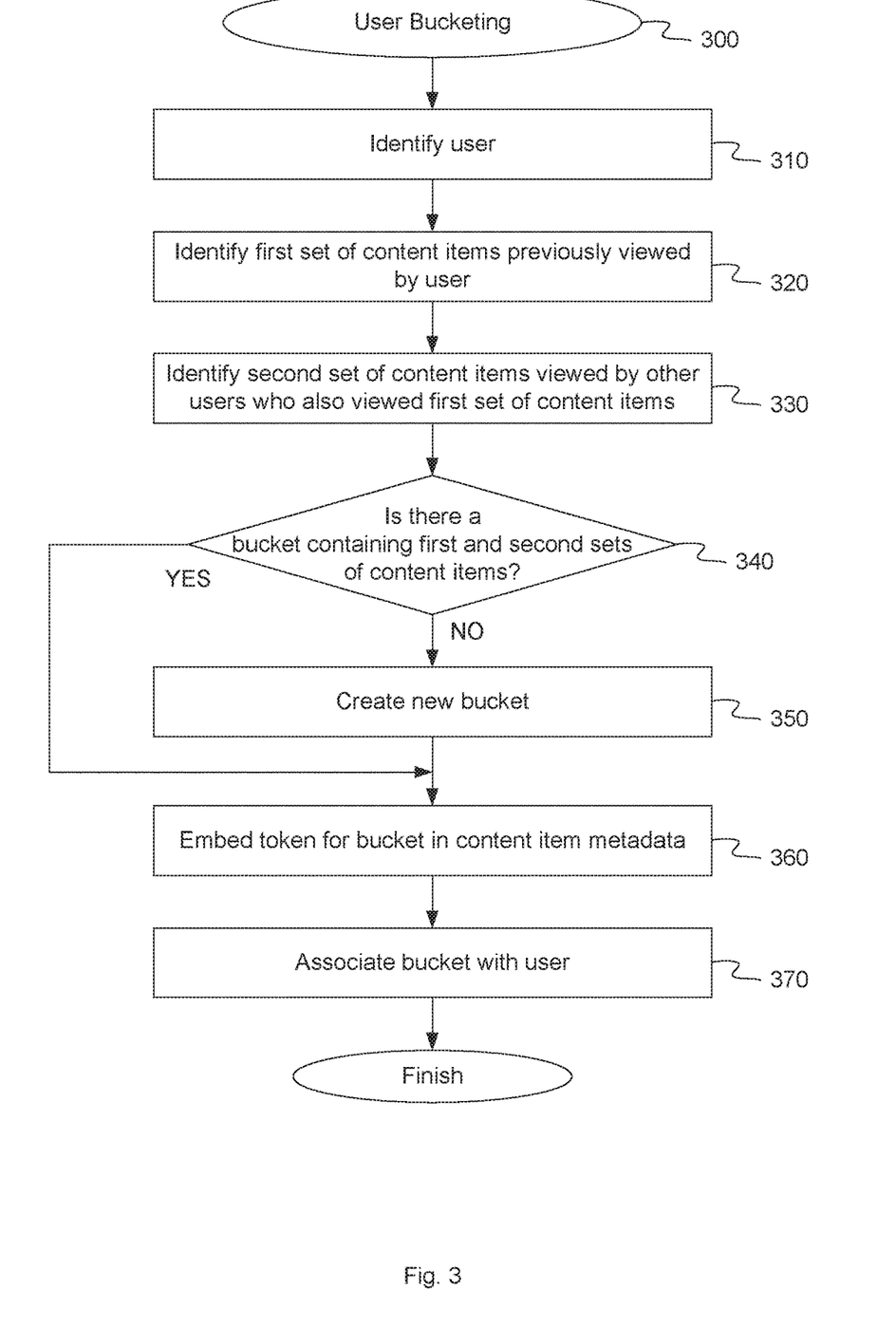
FIG. 3 is a flow diagram illustrating a method for user bucketing, according to some implementations.

FIG. 3 is a flow diagram illustrating a method for user bucketing, according to some implementations. The method 300 may be performed by processing logic that comprises hardware (e.g., circuitry, dedicated logic, programmable logic, microcode, etc.), software (e.g., instructions run on a processing device to perform hardware simulation), or a combination thereof. The method 300 identifies user buckets, create corresponding bucketing tokens and associate the bucketing tokens with the content items in the buckets. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by user bucketing module 112, as shown in FIGS. 1 and 2.

Referring to FIG. 3, at block 310, method 300 identifies a user. Bucket identifier 202 may identify the user in a number of ways. For example, the identified user may be a random user of content sharing platform, where user bucketing is eventually performed for all users. The identified user may be a current user, where the user bucketing operations are performed each time the user logs in to content sharing platform 110, performs a certain action (e.g., views a video), or at periodic intervals (e.g., once a week). The identified user may also be a user identified by ranking service 120.

At block 320, method 300 identifies a first set of content items previously viewed by the user. In one implementation, bucket identifier 202 accesses a watch history for the identified user, which may be stored in data store 116. The first set of content items may include all content items previously viewed by the user or some subset of the content items, such as the content items viewed within the last week, month, year, etc., or content items which the user commented on, liked, shared, etc.

At block 330, method 300 identifies a second set of content items viewed by other users who also viewed the first set of content items. In one implementation, bucket identifier 202 analyzes a watch list (i.e., a list of users who viewed the content item) of each of the first set of content items to identify other users who also viewed the first set of content items, and accesses the watch histories (i.e., a list of content items viewed by the users) of those other users to identify a common set of content items. These content items are likely of interest to both the first user and the other users since they were viewed by all.

At block 340, method 300 determines if there is already a bucket containing the first and second sets of content items. In one implementation, data store 116 may include a database or other data structure listing the previously created buckets as well as the associated content items. Bucket identifier 202 may access this database to determine whether an appropriated bucket already exists. In another implementation, bucket identifier 202 may access the content items, such as content item 140, identified as part of the second set and determine whether the content item 140 has any corresponding bucketing tokens 244, 246, 248 representative of the user buckets.

If there is no bucket, at block 350, method 300 creates a new bucket and at block 360, method 300 embeds a bucketing token for the bucket in the metadata for the content item. Token manager 204 can embed a bucketing token, such as tokens 244, 246, 248, within the metadata of a corresponding content item 140 or can create a new entry in the mapping database to associate the bucketing token with the content item.

At block 370, method 300 associates the bucket with the user. In one implementation, token manager 204 maintains a database or other data store (which may be part of the content item/token mapping database or a separate database) that includes a mapping between users of content sharing platforms 110 and user buckets. In order to associate the bucket with the user, token manager 204 may create a new entry or add to an existing entry, an indication that the user has demonstrated an interest in content items in a given bucket identified by the bucketing tokens.

Figure 4A:
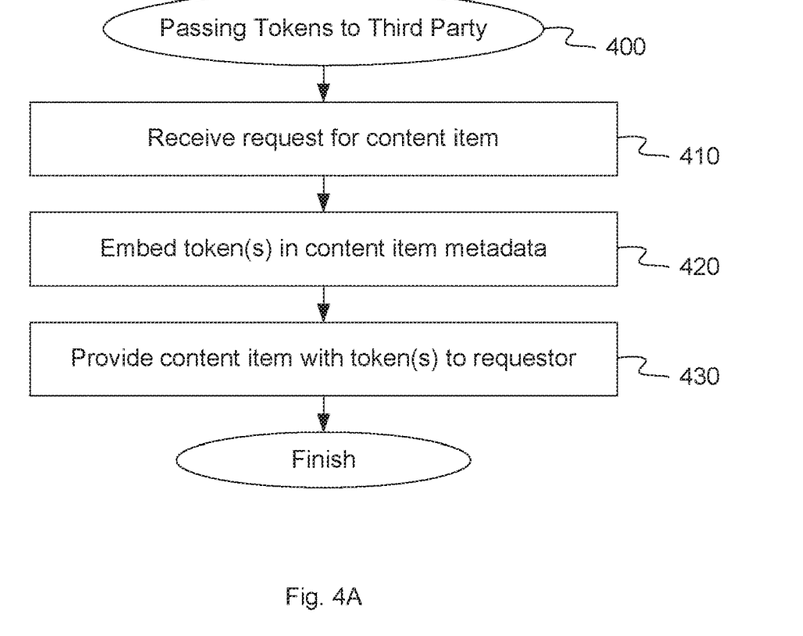
FIGS. 4A and 4B are flow diagrams illustrating methods for passing user bucketing tokens to a third party, according to some implementations.
Figure 4B:
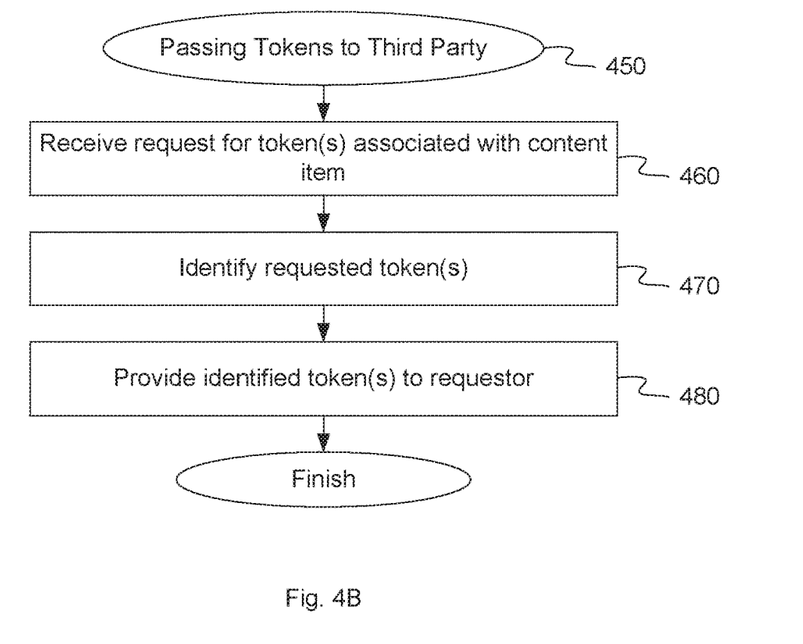

FIGS. 4A and 4B are flow diagrams illustrating methods for passing tokens to a third party, according to some implementations. The methods 400 and 450 may be performed by processing logic that comprises hardware (e.g., circuitry, dedicated logic, programmable logic, microcode, etc.), software (e.g., instructions run on a processing device to perform hardware simulation), or a combination thereof. The methods 400 and 450 can provide a user bucketing token to a third party, such as ranking service 120, in response to a request. In one implementation, methods 400 and 450 may be performed by user bucketing module 112, as shown in FIGS. 1 and 2.

Referring to FIG. 4A, at block 410, method 400 receives a request for a content item. In one implementation, user bucketing module 112 receives the request for the content item from ranking service 120. For example, a user of ranking service 120 may have requested to post a content item 140 in ranking service 120. The user may specify the content item 140 using a URL or other identifier 242 of the content item 140. In response to the user request, token interface module 122 of ranking service 120 may request the corresponding content item 140 from content sharing platform 110 (e.g., by sending the request over network 130).

At block 420, method 400 embeds the token or tokens for the associated buckets in the content item metadata. In one implementation, token manager 204 can embed a bucketing token, such as tokens 244, 246, 248, within the metadata of the requested content item 140. In another implementation, the bucketing tokens 244, 246, 248 may have previously been embedded within the metadata of the content item 140.

At block 430, method 400 provides the content item including the embedded tokens to the requestor. In one implementation, user bucketing module 112 provides the requested content item 140, identified by identifier 242 and including embedded bucketing tokens 244, 246, 248 to ranking service 120.

Referring to FIG. 4B, at block 460, method 450 receives a request for tokens associated with a content item. In one implementation, user bucketing module 112 receives the request for the bucketing tokens from ranking service 120. For example, a user of ranking service 120 may have posted a content item 140 in ranking service 120. The user may specify the content item 140 using a URL or other identifier 242 of the content item 140. In response to the user request, token interface module 122 of ranking service 120 may request the corresponding user bucketing tokens from content sharing platform 110 (e.g., by sending the request over network 130).

At block 470, method 400 identifies the requested tokens. In one implementation, token manager 204 identifies the content item 140 corresponding to the request and identifies the bucketing tokens 244, 246, 248 embedded therein. In another implementation, token manager 204 consults a database or other data structure that includes a mapping between content items and bucketing tokens. Token manager 204 can locate the corresponding entry for the content item 140 and determine the associated bucketing tokens 244, 246, 248.

At block 480, method 400 provides the identified tokens to the requestor. In one implementation, token manager 204 provides the requested bucketing tokens 244, 246, 248 to ranking service 120.

Figure 5A:
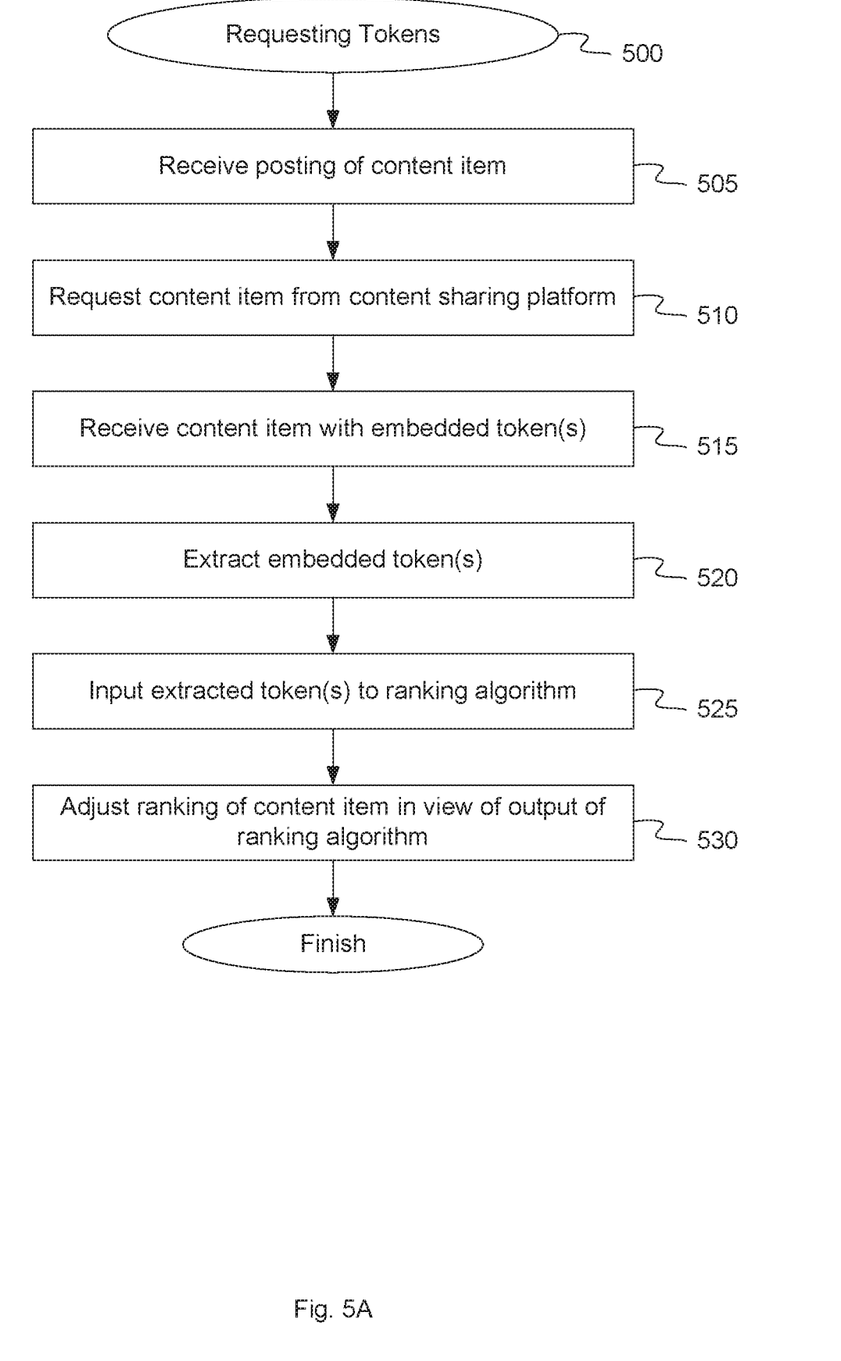
FIGS. 5A and 5B are flow diagrams illustrating methods for requesting user bucketing tokens from a content sharing platform, according to some implementations.
Figure 5B:
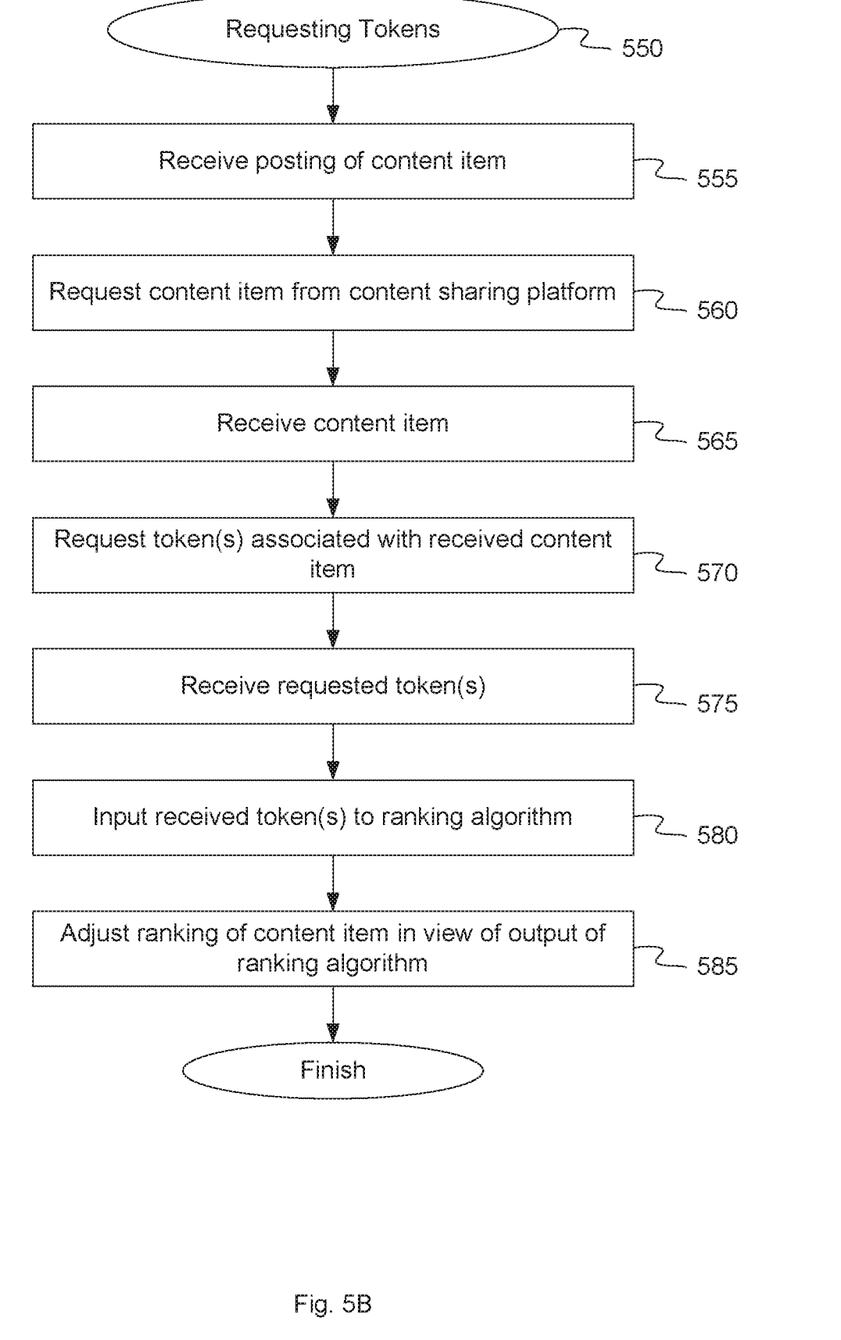

FIGS. 5A and 5B are flow diagrams illustrating methods for requesting user bucketing tokens, according to some implementations. The methods 500 and 550 may be performed by processing logic that comprises hardware (e.g., circuitry, dedicated logic, programmable logic, microcode, etc.), software (e.g., instructions run on a processing device to perform hardware simulation), or a combination thereof. The methods 500 and 550 allow a third party, such as ranking service 120, to obtain and use user bucketing tokens provided by content sharing platform 110 in ranking a set of content items. In one implementation, methods 500 and 550 may be performed by token interface module 122 and content ranking module 124, as shown in FIG. 1.

Referring to FIG. 5A, at block 505, method 500 receives a posting of a content item. In one implementation, a user of ranking service 120 may provide an identifier 242 (e.g., a URL) of a content item 140 that they wish to post in the ranking service 120. The ranking service 120 may have its own user interface through which the user may the identifier 242 or the ranking service 120 may pull the identifier from some other service or application (e.g., through an API).

At block 510, method 500 requests the content item from the content sharing platform 110. In response to the user request, token interface module 122 of ranking service 120 may request the corresponding content item 140 from content sharing platform 110 (e.g., by sending a request over network 130). At block 515, method 500 receives the requested content item with embedded tokens indicating the user buckets. In one implementation, the bucketing tokens 244, 246, 248 may be embedded within metadata of the requested content item 140. At block 520, method 500 extracts the embedded tokens from the content metadata. Token interface module 122 may scan the content item 140 to identify the embedded tokens 244, 246, 248 and extract and identified bucketing tokens.

At block 525, inputs the extracted tokens to a ranking algorithm. In one implementation, content ranking module 124 takes the bucketing tokens 244, 246, 248 extracted by token interface module 122 and applies the tokens as inputs to a ranking algorithm. The ranking algorithm may be a formula used by ranking service 120 to determine an order of content items that should be displayed in a given feed. The feed may be a public feed that is shared by multiple users of ranking service 120 or may be a private feed that is specific to one or more individual users. The ranking algorithm may be tailored to identify content items that are most likely to be of interest to the users of a given feed.

At block 530, method 500 adjusts a ranking of the content item in view of the output of the ranking algorithm. In one implementation, the ranking algorithm employed by content ranking module 124 outputs a ranking 160 of content items based on how likely the content items are to be of interest to the users of a given feed. In one implementation, the ranking algorithm sets the order of the content items in the ranking 160 based on the user bucketing information obtained from content sharing platform 110 and/or other factors indicative of the popularity of a content item. In one implementation, the ranking algorithm can determine the user buckets associated with a user of a given feed and weight content items from those user buckets more highly in the content ranking 160 for that feed. This may increase the chance that the feed will include more content items that are of interest to the user.

Referring to FIG. 5B, at block 555, method 550 receives a posting of a content item. At block 560, method 500 requests the content item from the content sharing platform 110. In response to the user request, token interface module 122 of ranking service 120 may request the corresponding content item 140 from content sharing platform 110 (e.g., by sending a request over network 130). At block 565, method 500 receives the requested content item.

At block 570, method 500 requests the tokens associated with the received content item from content sharing platform. In one implementation, token interface module 122 requests the bucketing tokens 244, 246, 248 corresponding to content item 140 from content sharing platform 110 if the bucketing tokens are not embedded within the content item metadata. At block 575, receives the requested tokens. In one implementation, token manager 204 consults a database or other data structure that includes a mapping between content items and bucketing tokens. Token manager 204 can locate the corresponding entry for the content item 140, determine the associated bucketing tokens 244, 246, 248 and provide the tokens to ranking service 120.

At block 580, method 500 inputs the extracted tokens to a ranking algorithm. In one implementation, content ranking module 124 takes the received bucketing tokens 244, 246, 248 and applies the tokens as inputs to a ranking algorithm. At block 585, method 500 adjusts a ranking of the content item in view of the output of the ranking algorithm. In one implementation, the ranking algorithm can determine the user buckets associated with a user of a given feed and weight content items from those user buckets more highly in the content ranking 160 for that feed.

Figure 6:
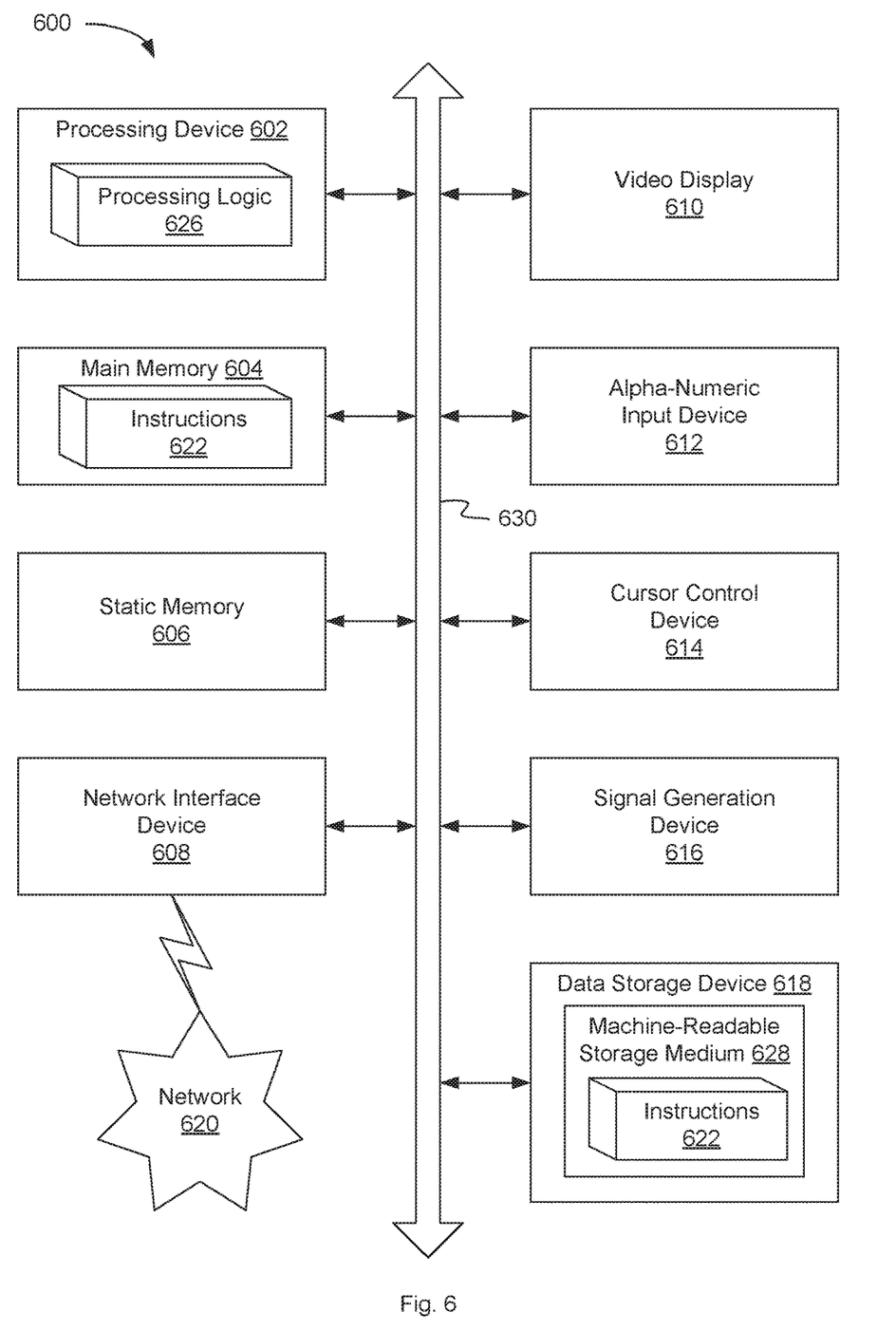
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of content sharing platform 110, running user bucketing module 112 or of ranking service 120, running token interface module 122 and content ranking module 124.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for improved ranking algorithms using unique bucketing identifiers, as described herein. While the machine-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   identifying, by a processing device, a set of content items for inclusion in a feed displayed to a user of a social network platform in a user interface of the social network platform, wherein the set of content items are identified as candidates for inclusion in the feed based on a ranking score of each content item from the set of content items, and wherein the ranking score of each content item is generated in addition to identifying one or more bucketing tokens for a respective content item from the set of content items;
   for each content item from the set of content items, identifying, by the processing device, one or more bucketing tokens, wherein each bucketing token comprises an identifier that identifies a plurality of content items as being associated with a group of users that have similar interests;
   adjusting, by the processing device, a ranking score of each content item from the set of content items that has at least one bucketing token matching a bucketing token associated with the user of the social network platform; and
   causing the set of content items identified for inclusion in the feed displayed to the user in the user interface of the social network platform to be modified based on adjusting ranking scores of respective content items from the set of content items.

2. The method of claim 1 wherein ranking scores of the set of content items are based on at least one of (i) watch histories of a plurality of other users followed by the user on the social network platform, or (ii) content item approvals of the plurality of other users on the social network platform.

3. The method of claim 1, wherein the bucketing token is embedded in a metadata of each of the plurality of associated content items or is associated with a corresponding content item of the plurality of associated content items via a mapping between the bucketing token and the corresponding content item, the mapping being stored in a data store.

4. The method of claim 1, further comprising receiving the set of content items from a content sharing platform.

5. The method of claim 4, further comprising:
for a first content item in the set of content items:
determining whether a bucketing token is embedded in metadata of the first content item;
responsive to determining that the bucketing token is embedded in the metadata of the first content item, extracting the bucketing token from the metadata of the first content item; and
for a second content item in the set of content items:
responsive to determining that the bucketing token is not embedded in metadata of the second content item, requesting the bucketing token for the second content item from the content sharing platform.

6. The method of claim 5, further comprising:
providing the bucketing token for the first content item to a ranking service;
providing, to the ranking service, a set of bucketing tokens associated with the user of the social network platform; and
receiving a ranking score for the first content item based on the bucketing token for the first content item and the set of bucketing tokens associated with the user of the social network.

7. The method of claim 6, wherein the first content item has a higher scoring weight if the bucketing token for the first content item matches any of the set of bucketing tokens associated with the user of the social network platform.

8. A non-transitory machine-readable storage medium storing instructions which, when executed, cause a processing device to perform operations comprising:
identifying a set of content items for inclusion in a feed displayed to a user of a social network platform in a user interface of the social network platform, wherein the set of content items are identified as candidates for inclusion in the feed based on a ranking score of each content item from the set of content items, and wherein the ranking score of each content item is generated in addition to identifying one or more bucketing tokens for a respective content item from the set of content items;
for each content item from the set of content items, identifying one or more bucketing tokens, wherein each bucketing token comprises an identifier that identifies a plurality of content items as being associated with a group of users that have similar interests;
adjusting a ranking score of each content item from the set of content items that has at least one bucketing token matching a bucketing token associated with the user of the social network platform; and
causing the set of content items identified for inclusion in the feed displayed to the user in the user interface of the social network platform to be modified based on adjusted ranking scores of respective content items from the set of content items.

9. The non-transitory machine-readable storage medium of claim 8 wherein ranking scores of the set of content items are based on at least one of (i) watch histories of a plurality of other users followed by the user on the social network platform, or (ii) content item approvals of the plurality of other users on the social network platform.

10. The non-transitory machine-readable storage medium of claim 8, wherein the bucketing token is embedded in a metadata of each of the plurality of associated content items or is associated with a corresponding content item of the plurality of associated content items via a mapping between the bucketing token and the corresponding content item, the mapping being stored in a data store.

11. The non-transitory machine-readable storage medium of claim 8, wherein the operations further comprise receiving the set of content items from a content sharing platform.

12. The non-transitory machine-readable storage medium of claim 11, wherein the operations further comprise:
for a first content item in the set of content items:
determining whether a bucketing token is embedded in metadata of the first content item;
responsive to determining that the bucketing token is embedded in the metadata of the first content item, extracting the bucketing token from the metadata of the first content item; and
for a second content item in the set of content items:
responsive to determining that the bucketing token is not embedded in metadata of the second content item, requesting the bucketing token for the second content item from the content sharing platform.

13. The non-transitory machine-readable storage medium of claim 12, wherein the operations further comprise:
providing the bucketing token for the first content item to a ranking service;
providing, to the ranking service, a set of bucketing tokens associated with the user of the social network; and
receiving a ranking score for the first content item based on the bucketing token for the first content item and the set of bucketing tokens associated with the user of the social network platform.

14. The non-transitory machine-readable storage medium of claim 13, wherein the first content item has a higher scoring weight if the bucketing token for the first content item matches any of the set of bucketing tokens associated with the user of the social network platform.

15. A system comprising:
a memory; and
a processing device, coupled to the memory, to:
identify a set of content items for inclusion in a feed displayed to a user of a social network platform in a user interface of the social network platform, wherein the set of content items are identified as candidates for inclusion in the feed based on a ranking score of each content item from the set of content items, and wherein the ranking score of each content item is generated in addition to identifying one or more bucketing tokens for a respective content item from the set of content items;
for each content item from the set of content items, identify one or more bucketing tokens, wherein each bucketing token comprises an identifier that identifies a plurality of content items as being associated with a group of users that have similar interests;
adjust a ranking score of each content item from the set of content items that has at least one bucketing token matching a bucketing token associated with the user of the social network platform; and cause the set of content items identified for inclusion in the feed displayed to the user in the user interface of the social network platform to be modified based on adjusted ranking scores of respective content items from the set of content items.

16. The system of claim 15 wherein ranking scores of the set of content items are based on at least one of (i) watch histories of a plurality of other users followed by the user on the social network platform, or (ii) content item approvals of the plurality of other users on the social network platform.

17. The system of claim 15, wherein the bucketing token is embedded in a metadata of each of the plurality of associated content items or is associated with a corresponding content item of the plurality of associated content items via a mapping between the bucketing token and the corresponding content item, the mapping being stored in a data store.

18. The system of claim 15, wherein the processing device is further to receive the set of content items from a content sharing platform.

19. The system of claim 18, wherein the processing device is further to:

for a first content item in the set of content items:

determine whether a bucketing token is embedded in metadata of the first content item;

responsive to determining that the bucketing token is embedded in the metadata of the first content item, extract the bucketing token from the metadata of the first content item; and for a second content item in the set of content items:

responsive to determining that the bucketing token is not embedded in metadata of the second content item, request the bucketing token for the second content item from the content sharing platform.

20. The system of claim 19, wherein the processing device is further to:

provide the bucketing token for the first content item to a ranking service;

provide, to the ranking service, a set of bucketing tokens associated with the user of the social network; and receive a ranking score for the first content item based on the bucketing token for the first content item and the set of bucketing tokens associated with the user of the social network platform.

* * * * *